United States Patent Office 3,484,262
Patented Dec. 16, 1969

3,484,262

POLYMER PIGMENTATION

Granville J. Hahn, Big Spring, Tex., assignor to Cosden Oil & Chemical Company, Big Spring, Tex., a corporation of Delaware No Drawing. Continuation-in-part of applications Ser. No. 525,854, Feb. 8, 1966, and Ser. No. 576,208, Aug. 31, 1966. This application Nov. 17, 1966, Ser. No. 594,998
Int. Cl. B44d *1/02;* B05c *5/00*
U.S. Cl. 117—16 11 Claims

ABSTRACT OF THE DISCLOSURE

Beads of crystal polystyrene, copolymer of styrene and acrylonitrile and impacts formed by graft polymerizing monomers thereof upon preformed rubber are colored in a dry state with a dry powdered pigment by abrasively mixing the beads with a selected quantity of pigment, and the mixture is mixed in a high speed mixer having a blade tip speed exceeding about 200 inches per second for a short period of a few minutes or less, whereby all of the pigment becomes firmly coated upon the surfaces of the beads. The beads may contain a foaming agent and may be partially expanded after pigmentation.

This invention is a continuation-in-part of my copending application, Ser. No. 576,208, filed Aug. 31, 1966, which is in turn a continuation-in-part of my copending application Ser. No. 525,854, filed Feb. 8, 1966, and relates to abrasion-adhered dry pigment upon both hard and foamed polymer particles, preferably beads formed in suspension polymerization.

This invention specifically relates to abrasion-adhered dry pigment upon polymer particles and the method of making such particles.

More particularly, the abrasion-adhered dry particles are usually ordinary or foamable beads formed in suspension polymerization of crystal polystyrene; high impact graft polymer formed of natural or synthetic rubber dissolved in styrene monomer and suspension polymerized to bead form; copolymers of styrene and acrylonitrile (SAN) suspension polymerized to bead form; graft copolymers of natural and synthetic rubbers, particularly polybutadiene, dissolved in acrylonitrile monomer and suspension polymerized to bead form (BAN); as well as graft copolymers of natural and synthetic rubbers, particularly polybutadiene, dissolved in acrylonitrile and styrene monomers and suspension polymerized to bead form (ABS).

The beads may be of a foamable character and for this purpose a foaming agent may be incorporated into the monomer as it is polymerized or, more practically, the finished bead can be soaked in a foaming agent such as a volatile solvent; typically, $C_4$–$C_7$ petroleum ethers, preferably saturated aliphatic hydrocarbon in this range, and then emperically air dried before abrasion-adhering the pigment thereto. The pigmented product containing foaming agent when ready for use may be directly expanded as a pigmented bead in a mold by activation of the forming agent with heat applied during the molding. It is sometimes desired, however, to preliminarily heat the abrasion-adhered pigmented bead containing the foaming agent by only slightly preheating the bead, so that it may then be handled and stored as a slightly expanded bead. Thereafter the slightly expanded pigmented bead is molded, simultaneously further expanding by the higher heat of the mold. The partially pre-expanded bead, as well as the foamed bead in the molding, has the pigment uniformly distributed thereabout with, however, a slightly lower color intensity thereon as produced by the intermediate expansion of the bead surfaces. The partially expanded bead may, of course, be inhibited from further expansion merely by cohering the partially expanded beads as they are extruded through an extrusion die to a molded extruded form, wherein the die walls prevent the cohered beads from further expansion as it is extruded.

The term "particles," accordingly, as the term used herein, refers preferably to suspension polymerized beads which may be expandible, but is broad enough to include fragments and molded pellets thereof having a large screen mesh size ranging upward from about 20 mesh sometimes to as high as about 5 mesh, U.S. Standard sieve. Preferably the colored particles of the present invention are beads formed by suspension polymerization of styrene monomer and high impact rubber solutions thereof, having a screen mesh size in the range of about 100 to 20. The pigment hereof is any dry powdered coloring material, soluble or insoluble in the polymer particles to be colored.

According to the present invention I have found that a markedly improved colored polymer particle is formed by abrasively or intensively mixing the polymer particles with pigment in a dry state such as by a high-speed rotating blade mixer; for example, a Prodex-Henschel, preferably having a rotational tip speed exceeding about 200 inches per second and ranging upward practically as high as 500 to 2500 inches per second. At such blade speeds the moving surfaces of the blade abrasively rub the powdered pigment into the surface of the polymer particles, such as beads, causing a surprisingly firm surface adhesion therebetween. This high intensity abrasive mixing breaks up flocs of colored pigment and transfers the same as very fine pigment particles evenly distributed over the beads as a relatively-strong adhered coating on the surfaces and in the surface pores or irregularities microscopically occurring upon the beads.

The abrasive, high-intensity mixing procedure hereof does not need to be applied for unduly long periods of time. For small mixers for small quantities, even less than a minute, such as fifteen to thirty seconds, can effect a substantial adhesion of the pigment upon the polymer particles. For lower intensity abrasive forces applied in the dry mixing, the adhesion effect becomes available in a somewhat more poorly adhered state by abrasively mixing for longer periods of time. The abrasive adhesion method hereof is in substantial contrast to mere dusting and tumbling of powdered pigment upon beads or to application of liquid compositions to effect the pigmentation according to prior proposals.

The present procedure produces a surprisingly unique product in that the pigment becomes relatively firmly adhered to the bead surfaces, rubbing off only with great difficulty, and only substantial abrasive rubbing against wet surfaces allows removal of any empirically significant quantity of the pigment once adhered by this method.

Great advantages attend the present abrasive mixing method. There is greatly reduced dusting of pigment per se. Such dust as appears in the final product is usually substantially the very fine pigmented bead per se. The procedure is available to give a more homogeneous color mixed in the desired proportions as set in the mixing to allow accurate reproduction of the color desired. The procedure allows formation of a masterbatch of color as a commercial product which can be blended back by the molder to the color needed in the molding by simple admixture of colorless beads to reduce the color intensity from the masterbatch. Surprisingly, the pigment upon the abrasively colored particles hereof does not transfer from the colored bead surfaces to other beads; for instance, white beads that may have been mixed with a pre-colored batch of beads do not become colored. The colored beads hereof remain stably colored with a surprising non-transferrable color from the pigmented particles to the unpigmented beads, remaining as a heterogeneous salt and pepper bead mix. Some pigments in varying degrees affect the physical properties of the plastic particles and molded products thereof, rendering it in some cases more flexible.

Moreover, since the pigment is usually stable and non-transferrable, colored foamable and partially foamed beads which may have been abrasively pigmented can be mixed with other beads which may not have been pigmented, or have been pigmented with a complementary color, and the other beads may also be foamed, partially foamed, or may have no foaming properties, as desired.

An outstanding advantage of the present method is that in a short period of intensive abrasive mixing of small particles such as beads, a finished pigmented product is available ready for molding. The product is homogeneous and the color is firmly adhered. The pigment is stably adhered and will not rub off. The colored beads are filled into a mold to give a superior reproducible color to the final molded product without intermediate steps of pelleting, etc., as presently widely practiced.

While, as stated, the larger particles such as pellets can be abrasively coated, the larger pelleted particles have a much reduced surface area and, consequently, cannot scure the pigment in so firm a bond to its surface as smaller beads; nor do the larger pelleted particles present a large enough surface to allow the pigment to be distributed as evenly thereover. Consequently, the larger pellets give a somewhat poorer distribution of pigment and adhesion of pigment to the surfaces thereof.

The present invention provides in the art a true, much simplified solid state dry coloring process for dry polymer particles which permits the manufacture of an easily reproduced colored polymer molding particle usable often for high quality end products having superior physical properties.

In accordance with the present invention, an improved colored polymer particle product and method is provided for making colored polymer particles. This method includes the abrasive high intensity mixing of pigment and small solid particles of polymer material. The conditions of mixing are such that intensity is sufficient to break down agglomerates of pigment, while abrading the pigment and forcing it to adhere to the particles so that substantial dusting will not occur on subsequent handling. The particles need contain only a small amount of moisture, if any. In the case of the preferred practice of the method as applied to coloring rubber-modified polymers, e.g., of the graft polymer variety and beads of graft copolymer of polybutadiene in mixed acrylonitrile and styrene monomers (ABS) formed by suspension polymerization thereof, the moisture content is usually below about 0.3% when the rubber content is about 20%; below about 0.2% when the rubber content is about 10%; and below about 0.15% when the rubber content is about 5%. In those instances where the method is applied to styrene homopolymer or styrene acrylonitrile copolymer (SAN), the moisture content does not usually exceed about 0.05%.

Preferably the intensity of mixing applied by the present method is sufficient to cause the discrete particles of pigment to enter surface regions of the polymer particles. To accomplish this purpose, the intensity of mixing is kept high while the size of pigment utilized is limited to comparatively small pigment, i.e., on the order of about one micron or less.

Mixing is preferably accomplished with a rotating blade-type mixer in which a linear velocity on the outer part of the blades at least as high as 200 inches per second, and usually about 500 to 2500 inches per second, is achieved.

The product provided by the present invention is particles of polymer material having pigment tightly adhered to its surface portions only, the adherence appearing to involve the entrapment of pigment within surface depressions or indentures in the outer regions of the particle and may be a factor to account for the low dusting, strong pigment adhesion of this product.

The preferred dried colored particles provided by the present invention are modified suspension polymerized beads of polystyrene having rubber incorporated therein, a graft high-impact polystyrene spheroid particle having between about 3 and 10% of graft polymerized rubber therein, and suspension polymerized mixed copolymer of acrylonitrile and styrene having polybutadiene graft polymerized therein, (ABS), the graft acrylonitrile-styrene copolymer spheroid particles having between about 3 and 25% of graft polymerized polybutadiene therein.

While various processes may be utilized for obtaining a suitable graft polymer or mixed copolymer of acrylonitrile and styrene particle for practice of the present invention, a typical process involves dissolving in the styrene monomer or mixture of monomers of styrene and acrylonitrile, from about one to twenty percent (preferably from about three to ten percent) of a rubbery material selected from the class consisting of SBR rubber, polybutadiene, polyisoprene, natural rubber, ethylene-propylene rubber, ethylene-propylene terpolymer rubber, polyisobutylene and butyl rubber in a complementary quantity of polymerizable monomer. The mass is polymerized while being stirred in a heated reaction vessel, until about 40% polymerization has occurred. Thereafter, it is suspended in a water system in which substantially an equal quantity of water is provided. Agitation and suspension chemicals, such as tricalcium phosphate, are utilized to maintain the suspension. The resulting product is dried to a desired low moisture level. Thereafter the dried spheroid polymerized particles having a particle size in the range of 100 to 20 U.S. Standard sieve, are mixed with pigment under the abrasive high intensity mixing conditions described.

The polymer particles such as beads are loaded into a high intensity mixer together with a suitable quantity of pigment. The individual pigment particle size is preferably comparatively small, often no larger than on the order of about one micron. It is understood that these particles may exist in agglomerates, wherein several individual particles are clustered together; however, the abrasive mixing reduces and distributes such clusters or flocs as individual particles evenly over the surfaces of the polymer beads. Accordingly, individual pigment crystals or particles are driven abrasively in the course of the mixing into surface depressions in the polymer spheroid particles and remain firmly adhered therein. In the case of the polymer beads referred to, a certain amount of pore or depression structure adjacent the surface is already present to accommodate, or assist in accommodating the entrance of pigment particles into surface regions of the bead. However, it is observed that the high intensity mixing of the discrete pigment particles apparently causes the pigment to force its way into surface structure of the polymer particle even in instances when surface depressions are not of sufficient size or number to originally accommodate the pigment.

The graft polymer type of spheroid bead has been observed to possess particularly good surface characteristics to receive pigment while in general the crystal material has appeared to be somewhat smoother. But in both instances the physical entrance of pigment body into surface regions of the particle occurs. While it is not desired to be limited by theory, it appears that the high intensity mixing drives or forces the pigment into the surface of the polymer particle. In some instances, it appears that the site of entrance of the pigment is scratched out or otherwise made by the abraiding action of the pigment itself.

It should be pointed out that the high intensity mixing step is sufficient to accomplish two purposes: The agglomerates of pigment characteristic of prior art solid-state coloring methods are broken up, and an adherence of pigment to the bead or similar particle of polymer material is obtained. This degree of adherence will vary over wide limits, and although the words "adhere" or "adherence" are seen to be relative, they are taken herein to refer to a sufficient degree of adherence such that pigment will not rub off materially on the hands during the course of handling particles of polymer material which have been abrasively dry or solid-state mixed.

The adherence is less in the case of the comparatively larger pigments which may be mixed in accordance with the present invention, such as ultramarine blue, phthalocyanin green or cadmium orange having particles of the order or about one micron up to two to three microns and better with smaller sized pigments such as white pigment (titanium dioxide), typically about 0.2 microns and carbon black even smaller.

To illustrate, high intensity mixing may be conducted on a batch of beads with a cadmium orange pigment. The batch of colored polymer beads so obtained is set aside and a fresh batch of beads is mixed under conditions of high intensity with rutile titanium dioxide pigment to obtain a white bead. The two batches are then loaded into the high intensity mixer in which they were originally colored and mixing is conducted in accordance with the same schedule of speed and time. Surprisingly, the product obtained is only a mixture of discrete orange and white polymer beads. There is substantially no transfer of color from the one bead batch to the other bead batch, even after a long period of high intensity mixing.

To further illustrate, a batch of white polystyrene beads may be prepared by the high intensity mixing of a graft polymer bead of about 5% polybutadiene rubber and 95% polymerized styrene, with titanium dioxide pigment of about 0.2 micron particle size. On mixing, a good white-colored product is obtained. Thereafter, a batch of polystyrene beads of the same nature employed in the white batch is mixed with carbon black pigment of a particle size on the order of about 20 millimicrons. The resulting product is a well-colored black polystyrene bead batch. The two batches are thereafter combined in the same type high intensity mixing equipment in which they were originally colored. After mixing together under high intensity conditions for a period of time substantially greater than was required for the initial coloring, it is observed that there is little or no transfer of the colors between the beads. Accordingly, the end product appears much as salt and pepper which has been shaken well together, with each retaining its own individual color characteristics.

The same experiment was repeated using ABS beads comprising 10% of polybutadiene and 45% of styrene monomer and 45% of acrylonitrile monomer, the solution being suspension polymerized in water to a bead of similar particle size. As before, a portion of these beads were pigmented with titanium dioxide and another portion with carbon black. Each portion was well colored and their admixture, despite further agitation, showed no transfer of color from one bead to another.

By way of contrast, phthalocyanine green pigment may be dispersed throughout a batch of similar polymer beads under high-intensity mixing conditions. The end product may be set aside and subsequently mixed with a white, orange, or black colored bead product obtained by high intensity mixing as described above. It is observed that the phthalocyanine green transfers slightly in the mixing process to the white, orange or black beads, as the case may be.

The character and extent of mixing will vary somewhat, usually ranging from about 15 seconds to one hour; typically, 14 seconds to 10 minutes at tip speeds from 500 to 2500 inches per second, in order to be of sufficiently high intensity to abrasively mix the color and beads and to fulfill the objectives of the present invention.

Whether the pigment be a comparatively small one, as preferred, or a large one, the product of high intensity mixing may be fed to a molding device such as an injection molding machine. Molded articles of quite high quality faithfully colored to specifications are obtained.

The colored beads obtained from the high intensity mixing step may be extruded or otherwise processed as desired to obtain an intermediate or an end product. When contrasted to colored polystyrene products obtained by prior art technology, it is found that the present product has superior characteristics.

Various high intensity mixers may be used. Typically these involve a rotating shaft which carries a transversely extending blade member or members such as an impeller turbine or the like. Preferably the mixing blade or blades are capable of achieving a linear tip velocity as stated of at least about 200 inches per second and preferably about 500 to 2500 inches per second. Exemplary of equipment which is satisfactory is the Papenmeier mixer, obtainable from Welding Engineers, Inc., Norristown, Pennsylvania, as illustrated, and the Prodex-Henschel mixer illustrated in United States Patent 2,945,634, mentioned above.

Preferably the mixer combines the principle of moving the particles being mixed both locally and in gross. That is to say, it is designed to turn over the material well in order that all the material in the mixer will, in due course, be within the region of high shear supplied by the rapidly moving mixer blades. The mixer of U.S. Patent 2,945,634, provides vortical mixing at high shear rates and, accordingly, accomplishes the objectives of both high shear local mixing and good movement in gross.

The mixer blade or rotor may operate at a variety of angular velocities, but it is important that a substantial peripheral speed be developed. For example, such commercial mixer with a pitched blade and having a radium of about one-third foot, may develop a speed on the order of about 720 inches per second at its blade tips and can accomplish mixing of a batch of beads and small pigment aggregating about 2000 grams in quantity in around 30 seconds. With some pigment, as little as 15 seconds will suffice, while in other instances a few minutes mixing will be desirable.

The following specific examples are offered by way of further illustration of the practice of the present invention and are not intended to be taken as limiting except to the extent that is specifically expressed in any given example.

EXAMPLE I

Polystyrene graft polymer beads are dry colored in accordance with the present invention by high intensity mixing of the beads with a light red pigment, specifically CdS.C dSe·$BaSO_4$. The polystyrene graft polymer has 5% of a rubbery polybutadiene polymerized therein, which is prepared in accordance with the process as described in U.S. Patent 3,047,534. The beads are recovered from the water suspension system and oven dried at about 140° F. until the moisture content is about 0.05%. The bead size ranges from about 20 mesh to about 100 mesh, with about 60 mesh being average. 11.35 grams of the light red pigment described above are added to a Papenmeier mixer along with the 2270 grams of the styrene graft polymer beads and are blended therein for about 30 seconds at 1800 r.p.m. Peripheral speed of the rotor ran on the order of about 720 inches per second. A thermocouple disposed clear of the mixer blades and into the body of the beads indicates a temperature of 80° F. was the maximum achieved during the course of mixing. At the end of the blending period, the beads were examined and found to be strongly adherently colored a light red. The color was uniformly dispersed. Upon examination under the microscope, it was found that the pigment had entered depressions in the surface of the bead and that there is a distinct distribution of color particles on the surface of the bead between the various sites of pigment embedded in surface regions of the bead. As examined by the naked eye, the bead appears to be quite thoroughly covered with pigment. The pigment-impregnated bead can be rubbed about in the hands, but the pigment does not rub off.

The colored bead of this example is used in various end product molding and extruding applications including injection molding, blow molding, sheet and profile extrusion. No intermediate compounding steps are used. A high quality molded end product is obtained which possesses superior physical and color characteristics.

EXAMPLE II

The procedure of Example I is repeated with a like quantity of polystyrene graft beads of the same nature. However, a yellow pigment is used, specifically 11.35 grams of $CdS \cdot BaSO_4$. The beads are colored the desired yellow, with the pigment well adhered in surface regions of the beads. Microscopic examination at 500 power indicates that the pigment is actually embedded or entrapped within depressions in the bead surface, as was observed in the prior example.

End products formed from the beads of this example are of high quality, as was the case in Example I.

EXAMPLE III

The procedure of Example I is repeated using the same quantity of polystyrene graft beads, but with 4.5 grams of ultramarine blue and a mixing time of about two minutes. The resulting beads are firmly and non-transferably colored blue, possessing about the same good physical and color characteristics as in the preceding examples. Microscopic examination at 500 power indicates that at least a part of the pigment is actually embedded in surface irregularities as well as being evenly distributed over regions of the bead surfaces. When mixing time for the ultramarine blue bead mix is reduced to only 30 seconds, the resulting product appears to carry well-dispersed pigment, but application of hard hand rubbing abrasion will rub off some of the pigment. End products formed from the beads of this example are, however, of high, easily reproduced color quality. This is true even if the comparatively short mixing time of 30 seconds is employed instead of the two minutes first referred to in this example. The result of the shorter mixing time is not found to be in product quality, but rather only in the tendency of the resulting colored beads to evidence slight dusting.

EXAMPLE IV

The procedure of Example I is repeated except that two grams of phthalocyanine green pigment are substituted for the pigment therein used and a ten minute mixing time is employed. The beads obtained are well colored with a similar slight dusting as in Example III. Even after ten minutes of high intensity mixing, a small amount of the pigment rubs off on the hands.

EXAMPLE V

The procedure of Example I is repeated, except that 11.5 grams of a finely pulverized mica carrying titanium dioxide on its surface, as the pigment, is used. The end products obtained by this example are of a metallic pearl color and possess good physical and color characteristics.

EXAMPLE VI

The procedure of Example I is repeated except that to the beads is added 45.4 grams of rutile titanium dioxide pigment. The pigment is found to be quite well adhered to the beads. Microscopic examination at 500 power revealed that the pigment is embedded or entrapped in depressions in the bead surface. Good results are achieved on molding end products without intermediate compounding steps.

EXAMPLE VII

Example I is repeated but, for the pigment therein employed, there is substituted 2.4 grams of a yellow pigment (specifically $CdS \cdot BaSO_4$), 4.2 grams of light red pigment (specifically $CdS \cdot CdSe \cdot BaSO_4$), and 2.4 grams of carbon black. The three pigments and beads are mixed to obtain well-colored brown beads having the pigment firmly adhered to the beads. On molding, high quality product of desired brown color is formed from these beads.

EXAMPLES VIII–XIV

The foregoing examples are repeated except that polystyrene graft polymer of the type involving ten percent of a 1,4-polybutadiene as the elastomer is utilized as the bead material. The moisture level was approximately 0.12%. It is found that comparable results are obtained in all instances.

EXAMPLE XV

The procedure of Example VII is repeated except that the quantity of pigment is increased ten-fold to 100 grams to that of a masterbatch concentrate of the heavy brown color is formed, packaged and shipped as such in a non-dusting, firmly-adherent concentrate. Thereafter, the molder mixes the concentrate with ten times the concentrate weight of fine uncolored beads just prior to molding to form a nontransferrable salt and pepper concentrate and colorless mix, which is then molded. The final molded product is found to have the same fine colored character as in Example VII.

EXAMPLES XVI–XXII

Examples I–VII are repeated except that an SBR rubber-type polystyrene graft polymer (6% SBR rubber) is used instead of the polybutadiene-type polystyrene graft polymer therein employed. The moisture level is about 0.07%. The results are about the same as those obtained in Examples I–VII.

EXAMPLE XXIII

Example I is repeated, using 4.5 grams of carbon black (pigment size ranging from about 0.007 to 0.045 micron). The beads have the pigment well adhered and form high-quality end products of a quality black color.

EXAMPLE XXIV 50 parts of styrene monomer and 50 parts of acrylonitrile monomer are added to a vessel equipped with heating and stirring means. 8 parts of polybutadiene are added to the vessel and dissolved in the monomer mixture with heating and stirring. 0.02 part of dodecyl mercaptan is added as a modifier. The mixture is stirred at 90° C. for 7 hours until approximately 18% of the monomer mixture has polymerized. The polymerized mass is then added to an aqueous suspension bath of the following formulation:

| | Parts |
|---|---|
| Distilled water | 100 |
| Trisodium phosphate | 0.4 |
| Calcium chloride | 0.45 |
| Lecithin | 0.03 |
| Anionic 08 | 0.15 |

The aqueous suspension is then polymerized with agitation at 95° C. until about 35% is polymerized. Then 0.5 part of benzoyl peroxide is added and the temperature is raised to boiling. The agitation is continued in the boiling suspension for a total of 7 hours. The finished polymer consists of small, spherical beads. The polymer beads are decanted from the bath, washed with 10% HCl, and then washed with water and dried in air. The ABS beads are of intermediate size, about 90% passing through a 40 mesh sieve, the balance passing through a 60 mesh sieve except for about 1% which passes through a 20 mesh sieve. The bead was opaque and light colored with an impact strength of about 2.5 foot pounds per inch of notch (Izod). The beads were dry colored as described in Example I by high intensity mixing with the same light red pigment in a Pepenmeier mixer using the same proportion of pigment to bead. The color was a strongly-adhered light red, uniformly dispersed, and under the microscope it appeared that the pigment had entered depressions in the surface of the bead and could not be rubbed off by handling or rubbing in the hands. It gave an evenly colored molded end product.

EXAMPLES XXV–XXXI

As in Examples I–VII, the ABS beads of Example XXIV are abrasively colored with a yellow pigment, ultramarine blue, phthalocyanine green, titanium dioxide on pulverised mica, titanium dioxide on rutile and carbon black, respectively. A high impact ABS bead with a pigment firmly adhered and evenly colored is obtained in each instance as described in Examples I–VII, respectively. These beads without any further processing are readily fabricated (molded or extruded) on conventional equipment into solid and hollow objects equally as well or better than pre-colored pellets.

EXAMPLE XXXII

The procedure of Examples I and XXIV is repeated except that the rubbery polymer first dissolved in the mixture of styrene and acrylonitrile to form the impact is GRS rubber consisting of a copolymer of 25% styrene and 75% butadiene. As in Example XXIV, the rubber is first dissolved in the monomer mixture and heated until about 20% of the monomers are prepolymerized and the partially polymerized solution is then transferred to an aqueous suspension bath of the same composition and heated with agitation and with ultimate addition of peroxy catalyst until the polymer product is converted to high impact beads of translucent character having a similar high impact strength. These beads after washing and drying are then abrasion agitated with a corresponding amount of pigment each varied as described in Examples I–VII, and again a tightly adhered pigmented bead is obtained which could be molded in any usual molding procedure to form an evenly pigmented product.

EXAMPLE XXXIII

80% styrene and 20% acrylonitrile monomers are mixed and polymerized to bead form by agitation as a suspension in the same bath as described in Example XXIV. The purified water-white crystalline beads are colored by abrasion agitation with pigments as described in Examples I–VII respectively, and correspondingly colored pigmented beads are formed in which the pigment is evenly distributed and tightly adhered to the bead.

EXAMPLE XXXIV

To 100 parts of polystyrene homopolymers beads is added 10 parts of petroleum ether which consists primarily of pentanes. The mixture is allowed to soak for twenty four hours at room temperature, but under sufficient pressure to prevent vaporization of the petroleum ether. The remaining free liquid is decanted from the beads.

The beads now containing the hydrocarbon absorbed therein are placed in an intensive mixer as described in Example I. To the beads are added 0.5 parts of an ultramarine blue pigment. The beads are then subjected to an intensive mixing for 45 seconds with a blade speed of 1800 r.p.m., the intensity being that described in Example I.

On removal from the blender the beads are found to be evenly colored a medium blue. No expansion of the beads takes place as a result of the mixing.

The beads are then subjected to boiling water treatment for 5 minutes. They expand to a much larger size and turn a pale blue color as a result of the expansion. However, they are not fully expanded and are suitable for subsequent molding in a closed mold to form a light blue pigmented molded product having the color evenly distributed.

In the same or a similar manner beads formed and pigmented in other examples, II through XXXIII, as set forth above, may be made into foamed or partially foamed form of various polymers pigmented with various pigments.

From the foregoing description and examples it will be appreciated that a process for making high-quality colored polystyrene particles has been provided. Moreover, it will be understood that quality polymer end products may be made from such particles. Further, a stable color adherent bead of polymer material that will not dust nor rub off easily has been disclosed.

Having described the invention in connection with certain specific embodiments thereof, it is to be understood that further modifications may now suggest themselves to those skilled in the art.

What is claimed is:

1. A pigmented polymer particle selected from the group consisting of polystyrene, copolymers of styrene and acrylonitrile, polymerized solutions of rubber in styrene, and polymerized solutions of rubber in mixtures of styrene and acrylonitrile, said polymer particles having a screen mesh size in the range of 20 to 200 U.S. Standard sieve and having a pigment homogeneously abrasively adhered to the surfaces thereof by intensively mixing the beads with a powdered pigment in the dry state by a high-speed rotary blade mixer having a tip speed exceeding about 200 inches per second.

2. The pigmented particles of claim 1 wherein the particles are beads.

3. The pigmented polymer particles of claim 1 wherein the particles are beads containing a foaming agent.

4. Pigmented polymer particles as defined in claim 1 having a pigment abrasively adhered to the surfaces thereof, said particles further including a foaming agent and being partially expanded to an intermediate size.

5. Pigmented polymer particles as defined in claim 1 wherein the particles are polystyrene beads.

6. Pigmented polymer particles as defined in claim 1 wherein the particles are partially foamed polystyrene beads.

7. Pigmented polymer particles as defined in claim 1 wherein the particles are high impact polystyrene beads.

8. Pigmented polymer particles as defined in claim 1 wherein the pigment is carbon black.

9. Pigmented polymer particles as defined in claim 1 wherein the pigment is titanium dioxide.

10. Pigmented polymer particles as defined in claim 1 wherein the particles are beads of a copolymeric solution of polybutadiene rubber in styrene, and acrylonitrile monomers.

11. Pigmented polymer particles as defined in claim 10 wherein the pigmented particles are partially foamed.

References Cited

UNITED STATES PATENTS

| | | | |
|---|---|---|---|
| 2,445,928 | 7/1948 | Sommer | 117—100 X |
| 2,572,068 | 10/1951 | Sommer | 117—100 X |
| 2,817,604 | 12/1957 | Louis | 117—100 X |
| 2,945,634 | 7/1960 | Beck et al. | 241—98 |
| 2,987,496 | 6/1961 | Simpson | 260—40 |
| 3,035,003 | 5/1962 | Kessler | 260—28.5 |
| 3,047,534 | 7/1962 | Dyer | 260—45.5 |
| 3,056,752 | 10/1962 | Zweigle | 260—2.5 |
| 3,057,751 | 10/1962 | Nogle | 117—100 |
| 3,058,926 | 10/1962 | Eichhorn | 117—100 X |
| 3,083,116 | 3/1963 | Berndt | 117—100 X |
| 3,085,989 | 4/1963 | Jordan | 117—100 X |
| 3,090,755 | 5/1963 | Erchak | 117—100 X |

(Other references on following page)

UNITED STATES PATENTS

| | | | |
|---|---|---|---|
| 3,104,196 | 9/1963 | Shannon | 117—100 X |
| 3,154,604 | 10/1964 | McMillan | 117—100 X |
| 3,185,588 | 5/1965 | Resnick | 117—100 X |
| 3,196,032 | 7/1965 | Seymour | 117—100 X |
| 3,245,829 | 4/1966 | Beauliew | 117—100 X |
| 3,291,762 | 12/1966 | Raymond | 117—100 X |
| 3,296,154 | 1/1967 | Ferrigno | 17—100 X |
| 3,361,688 | 1/1968 | Bonitz et al. | 117—100 X |
| 3,369,927 | 2/1968 | Voris | 117—100 |

WILLIAM D. MARTIN, Primary Examiner

P. ATTAGUILE, Assistant Examiner

U.S. Cl. X.R.

117—100; 260—2.5; 264—109